UNITED STATES PATENT OFFICE.

FRANZ AIGNER, OF POTSDAM, GERMANY, ASSIGNOR TO THE FIRM OF DYNAMIT-ACTIEN-GESELLSCHAFT VORMALS ALFRED NOBEL UND CO., OF HAMBURG, GERMANY.

PROCESS OF MANUFACTURING NITROGLYCERIN.

No. 913,653.     Specification of Letters Patent.     Patented Feb. 23, 1909.

Application filed February 28, 1905. Serial No. 247,777.

*To all whom it may concern:*

Be it known that I, FRANZ AIGNER, a subject of the Emperor of Austria-Hungary, residing at 10 Neue Königstrasse, Potsdam, Kingdom of Prussia, German Empire, have invented new and useful Improvements in Processes of Manufacturing Nitroglycerin, of which the following is a specification.

This invention relates to the process of manufacturing nitro-glycerin by causing a mixture of nitric acid and sulfuric acid to act on glycerin, and has for its object to render the process more expeditious, considerably safer and cheaper.

The common process of manufacturing nitro-glycerin differs from the usual process of manufacturing nitro-cellulose among other things essentially in that the waste acids from the nitration of glycerin cannot be revived but must be denitrated. The reason of the said difference is that the nitrating acids of the nitro-glycerin manufacture are used up by the nitrating process in a larger degree than in the manufacture of nitrocellulose. From these reasons the waste acids of the nitro-glycerin manufacture that have been separated from the nitro-glycerin by settling etc. are with reference to their composition by far inferior to those of the nitro-cellulose manufacture.

I have now found that the reviving of the waste acids of the nitro-glycerin manufacture (which acids contain glycerin compounds) gives an unexpected advantage, because revived waste acid gives an essentially higher amount of nitro-glycerin than the original nitrating acid with the same relative proportions of sulfuric acid, nitric acid and water in the same manner of operation. The reviving of the waste acid containing glycerin compounds is effected by adding a fresh mixture of highly concentrated sulfuric and nitric acid to the waste acid in a suitable proportion.

In nitrating 100 grams of glycerin with 900 grams of freshly prepared nitrating acid of the composition $H_2SO_4$ ---------------- 60%
$HNO_3$ ---------------- 30%
$H_2O$ ---------------- 10%

I have for instance obtained 201 grams pure nitro-glycerin. I obtained, however, 228 grams pure nitro-glycerin in nitrating 100 grams glycerin with 900 grams of a once revived nitrating acid of the same relative proportions of acids and water $(H_2SO_4:HNO_3:H_2O = 60:30:10)$, but composed of 450 grams of waste acid from a previous nitrating operation and 450 grams fresh acid. A similar favorable result was obtained by a further use of the already once revived nitrating acid containing glycerin compounds. I obtained 225 grams pure nitro-glycerin by nitrating 100 grams glycerin with 900 grams nitrating acid, twice revived, of the same relative proportions of acids and water as quoted $(H_2SO_4:HNO_3:H_2O = 60:30:10)$ but composed of 450 grams waste acid from the third nitrating operation and 450 grams fresh acid.

The new technical effect obtained by using revived waste nitrating acid containing glycerin compounds consists in an essential increasing of the produced amount of nitro-glycerin. The said effect is shown in an especially distinct degree if a diluted nitrating acid is used. I obtained 170 grams pure nitro-glycerin by nitrating 100 grams glycerin with 1200 grams fresh nitrating acid of the composition $H_2SO_4$ ---------------- 56.7%
$HNO_3$ ---------------- 28.3%
$H_2O$ ---------------- 15.0%

I obtained however 218 grams pure nitro-glycerin, i. e. surplus of 48 grams over the quoted amount, by nitrating 100 grams glycerin with 1200 grams once revived nitrating acid of the same relative proportions of acids and water as quoted $(H_2SO_4:HNO_3:H_2O = 56.7:28.3:15.0)$ but composed of 750 grams waste acid from the first nitration and 450 grams fresh nitrating acid. A twice revived waste acid of the same percentage gave 221 grams pure nitro-glycerin, i. e. a surplus of 51 grams when compared with the result of the fresh nitrating acid. One can obtain the said advantage of an increased yield of pure nitro-glycerin by using revived nitrating acid even with acids containing 20 per cent. water, i. e. approaching to those acid mixtures which cannot have any nitrating action.

The difference in the nitrating action between a revived nitrating acid and a fresh acid has been quite unknown in the manufacture of nitro-cellulose. The possibility by using revived acids of obtaining essentially higher amounts of nitro-glycerin than by using fresh acids enables the operator to vary the degree of concentration of nitrating acids in a relatively wide range and especially to use less concentrated nitrating acids, the use of which was formerly uneconomical in the prior process without reviving. The concentration of the usual nitrating acid for manufacturing nitro-glycerin differed hitherto only by 5 per cent. It has been considered hitherto by all experts as nearly unavoidable to use only acids of the highest concentration in order to prevent a reduction of the yield of nitro-glycerin to below 200 grams of pure nitro-glycerin, the average yield being 205 grams pure nitro-glycerin from 100 grams glycerin. By the possibility given by the present invention of using acids with 10 and even 15 per cent. water one obtains the further advantage of a greater security for the nitrating operation. For instance I obtain an essentially gentle nitration of glycerin without the formation of froth by using a nitrating acid of the composition

according to my method instead of the usual mixture.

| | |
|---|---|
| $H_2SO_4$ | 60% |
| $HNO_3$ | 35% |
| $H_2O$ | 5% |

The greater yield of trinitroglycerin obtained by using the waste acid instead of fresh acids alone is not caused by nitroglycerin suspended in the spent acid. By causing waste acid from nitrating glycerin to stand for a sufficient time, one can only obtain from 1.1 to 1.4% trinitroglycerin. By the present process, however, a far greater yield of trinitroglycerin can be obtained than by causing the waste acid to stand. The inventor has also stated the reason for the increasing of the yield of trinitroglycerin by using a waste acid. In the nitrating process carried out in the ordinary way, besides trinitroglycerin (i. e. the common nitroglycerin) relatively large amounts of lower nitrated nitroglycerins (dinitroglycerin and mononitroglycerin) will be generally formed. The common trinitroglycerin now is very slightly soluble in acids and separates therefore quickly and relatively completely. The mononitroglycerin and dinitroglycerin are, however, very soluble in acids and can therefore not separate, even by very long standing. Mononitroglycerin and dinitroglycerin are converted into trinitroglycerin, if one causes fresh nitrating acids to act on them. On this the new process is based.

What I claim as my invention, and desire to secure by Letters Patent, is—

The process of nitrating glycerin to obtain a maximum yield of tri-nitro-glycerin from successively treated portions of glycerin, which consists in nitrating a quantity of glycerin with a suitable quantity of a fresh mixture of concentrated nitric and sulfuric acids, separating the resultant tri-nitro-glycerin from the partially exhausted acids, containing less highly nitrated derivatives of glycerin, adding a suitable quantity of fresh concentrated nitric and sulfuric acids to restore the acid mixture to substantially its original percentage content of nitric acid, sulfuric acid and water, and nitrating a second portion of glycerin with said acid mixture, substantially as described.

In testimony whereof I have signed my name to this specification in the presence of two subscribing witnesses.

FRANZ AIGNER.

Witnesses:
 WOLDEMAR HAUPT,
 HENRY HASPER.